(12) United States Patent
Lopez (10) Patent No.: US 10,617,497 B2
(45) Date of Patent: Apr. 14, 2020

(54) DENTURE RETAINING BAR AND SYSTEM

(71) Applicant: Rigo Dental Technologies, LLC, Passaic, NJ (US)

(72) Inventor: Rigoberto Lopez, Passaic, NJ (US)

(73) Assignee: RIGO DENTAL TECHNOLOGIES, LLC, Passaic, NJ (US)

( * ) Notice: Subject to any disclaimer, the term of this patent is extended or adjusted under 35 U.S.C. 154(b) by 0 days.

(21) Appl. No.: 16/317,460

(22) PCT Filed: Jul. 6, 2017

(86) PCT No.: PCT/US2017/040905
§ 371 (c)(1),
(2) Date: Jan. 11, 2019

(87) PCT Pub. No.: WO2018/017331
PCT Pub. Date: Jan. 25, 2018

(65) Prior Publication Data
US 2019/0231495 A1    Aug. 1, 2019

Related U.S. Application Data

(60) Provisional application No. 62/365,673, filed on Jul. 22, 2016.

(51) Int. Cl.
*A61C 13/273* (2006.01)
*A61C 8/00* (2006.01)
(Continued)

(52) U.S. Cl.
CPC .............. *A61C 13/273* (2013.01); *A61C 8/00* (2013.01); *A61C 8/0048* (2013.01); *A61C 13/01* (2013.01);
(Continued)

(58) Field of Classification Search
CPC ... A61C 13/273; A61C 13/01; A61C 13/2653; A61C 8/0048
(Continued)

(56) References Cited

U.S. PATENT DOCUMENTS 4,784,608 A    11/1988  Mays
4,931,016 A    6/1990   Sillard
(Continued)

FOREIGN PATENT DOCUMENTS

WO    2016161436 A1    10/2016
WO    WO-2016161436 A1 * 10/2016 ........... A61C 8/0048

*Primary Examiner* — Matthew M Nelson
(74) *Attorney, Agent, or Firm* — Weitzman Law Offices, LLC (57) ABSTRACT

A denture retaining system and a denture bar constructed to be affixed in a human mouth, the denture bar including a distal end, lingual-side surface, vestibular-side surface, bone-facing surface and superstructure-facing surface opposite the bone-facing surface. The bone-facing surface at the distal end is relieved from the superstructure-facing surface at the distal end by an angle of between 10° and 25° relative to an axis perpendicular to a longitudinal plane passing through the lingual side and vestibular side surfaces of the denture bar. The system also includes an overdenture superstructure having a distal surface that substantially conformingly mates to the denture bar distal end when the overdenture superstructure is positioned against the denture bar superstructure-facing surface, and is coupled to the denture bar by at least one attachment element located at a position to an anterior side of a first molar position.

20 Claims, 8 Drawing Sheets

(51) Int. Cl.
    *A61C 13/225*     (2006.01)
    *A61C 13/265*     (2006.01)
    *A61C 13/01*     (2006.01)

(52) U.S. Cl.
    CPC .......... *A61C 13/225* (2013.01); *A61C 13/265* (2013.01); *A61C 13/2653* (2013.01)

(58) Field of Classification Search
    USPC ........................................................ 433/172
    See application file for complete search history.

(56) References Cited

U.S. PATENT DOCUMENTS

| | | |
|---|---|---|
| 2010/0323325 A1 | 12/2010 | Berger |
| 2012/0058449 A1 | 3/2012 | Sklarski et al. |
| 2013/0323679 A1* | 12/2013 | Berger ............... A61C 13/0001 433/173 |
| 2016/0270886 A1* | 9/2016 | Schulter ............... A61C 8/0027 |
| 2016/0317262 A1* | 11/2016 | Stobbe ................. A61C 8/0048 |
| 2018/0000568 A1* | 1/2018 | Berger ................. A61C 8/0048 |

\* cited by examiner

DENTURE RETAINING BAR AND SYSTEM

FIELD OF THE INVENTION

This disclosure relates generally to dental prosthetics and, more particularly, to dental prosthetics for dentures.

BACKGROUND

Dentures are removable appliances designed to provide a replacement for teeth and surrounding tissue. In general, certain types of dentures for the upper or lower jaw use a milled denture bar (also called an implant bar) made out of a strong biocompatible metal or alloy such as, for example, titanium, a titanium alloy, a cobalt alloys, a chromium alloy, a palladium alloy, a tantalum alloy, or a zirconium alloy and is connected to the jaw by, for example, screws, and forms the supporting structure for a removable overdenture prosthesis containing false teeth.

Such denture bars typically include some type of attachment, commonly a ball attachment or locator designed to correspondingly mate with a component of a superstructure of the overdenture to keep the overdenture in place on the person during normal activity, while allowing it to be removed periodically, for example, for cleaning.

These types of dental prostheses are often recommended for people with two types of malocclusion, the types known as Class II distocclusion (also known as retrognathism, overjet, or overbite) and Class III mesiocclusion (also known as prognathism, negative overjet, or underbite), however, doing so creates a problem, particularly for people with a powerful bite, because those conditions tend to cause the overdenture to dislodge in the rear.

To the extent denture bar and overdenture prostheses are used on patients with Class II distocclusion or Class III mesiocclusion, the dislodgment problem is typically addressed by using small locking screws or a plunger mechanism ("locking mechanism")) to affix the rear of the overdenture to the denture bar. However, this requires the denture wearer to use a small screwdriver, wrench, key or other appropriate implement to remove the locking mechanism every time the overdenture needs to be removed. This solution is inconvenient, problematic for persons with reduced dexterity (for example, the elderly), and, in the case of screw locking mechanisms, presents a risk of losing such small screws or, even worse, swallowing one.

Thus, there are ongoing problems when overdenture/denture bar prostheses are used on people with Class II distocclusion and Class III mesiocclusion.

SUMMARY

I have devised a denture retaining system that enables overdenture/denture bar prostheses to be used on people with Class II distocclusion and Class III mesiocclusion and does not suffer from the above dislodgement problems or require use of small locking screws or a plunger locking mechanism near the back.

One aspect of this disclosure involves a denture retaining system including a denture bar constructed to be affixed in a human mouth, the denture bar having a distal end, a lingual-side surface, a vestibular-side surface, a bone-facing surface and a superstructure-facing surface opposite the bone-facing surface. The bone-facing surface at the distal end is relieved from the superstructure-facing surface at the distal end by an angle of between 10° and 25° relative to an axis perpendicular to a longitudinal plane passing through the lingual-side and vestibular-side surfaces of the denture bar. The system also includes an overdenture superstructure having a distal surface that substantially conformingly mates to the distal end of the denture bar when the overdenture superstructure is positioned against the superstructure-facing surface of the denture bar, and is coupled to the denture bar by at least one attachment element located at a position to an anterior side of a first molar position.

Another aspect of this disclosure involves a denture bar constructed to be affixed in a human mouth and be engaged by an overdenture superstructure. The denture bar includes a distal end, a lingual-side surface, a vestibular-side surface, a bone-facing surface, a superstructure-facing surface that is opposite the bone-facing surface, and at least one attachment element located at a position on the denture bar to an anterior side of a first molar position.

Advantageously, my solution allows for use of conventional ball attachments, locators and/or clips to be used to secure the overdenture to the denture bar.

Additionally, my solution allows for use of fewer attachments than used to conventionally affix a overdenture superstructure to a denture bar.

Moreover, solution accommodates use of one or more attachments on any of the superstructure-facing side of the dental bar, the lingual-side of the dental bar or the vestibular-side of the dental bar.

Still further some implementations of my solution include a lip along a substantial portion of the vestibular-side of the overdenture superstructure that aids in preventing of separation of the overdenture acrylic from the superstructure when installed in a person's mouth.

Additional implementations of my solution involve one or more of the lingual-side surface and vestibular-side surface to each be angled relative to an axis perpendicular to a longitudinal plane passing through the lingual-side and vestibular-side surfaces of the denture bar at an angle of between 10° and 25°. For one subset of those implementations, the angle of the lingual-side surface and vestibular-side surface will be the same, and for another subset, the angles of the lingual-side surface and vestibular-side surface need not be the same. Rather, they can differ by up to 5°, although this is less desirable.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Our technical solution improves upon current overdenture/denture bar prosthesis technology and provides a solution to aforementioned problems.

For purposes of understanding and simplicity, the term "bone-facing surface" as used herein is intended to mean, a) with respect to a denture bar for the upper jaw, the surface facing the bone of the superior maxilla and nasal cavity, and b) with respect to a denture bar for the lower jaw, the surface facing the bone of the mandible.

Likewise, the term "superstructure-facing surface" with respect to a denture bar is intended to mean the surface of the denture bar opposite the bone-facing surface that will be closest to the false teeth-containing overdenture.

Figure 1A:
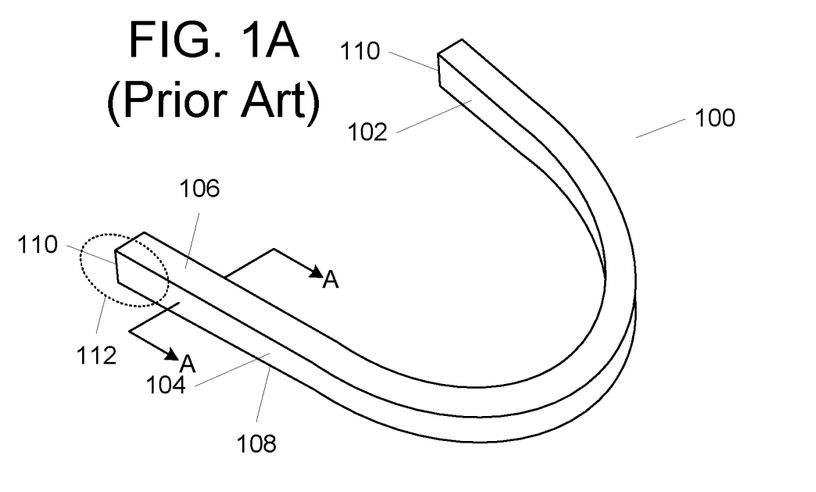
FIG. 1A illustrates, in simplified form, one representative example of a conventional denture bar.

FIG. 1A illustrates, in simplified form, one representative example of a conventional denture bar 100. As shown, the denture bar 100 has a lingual-side surface 102, a vestibular-side surface 104, a superstructure-facing surface 106 and a bone-facing surface 108. The lingual-side surface 102 and vestibular-side surface 104 are opposite each other, as are the superstructure-facing surface 106 and bone-facing surface 108. The denture bar also has a distal end 110 (on each side in the case of a full denture or on one side in the case of a partial denture).

Figures 1B, 1C, 1D:
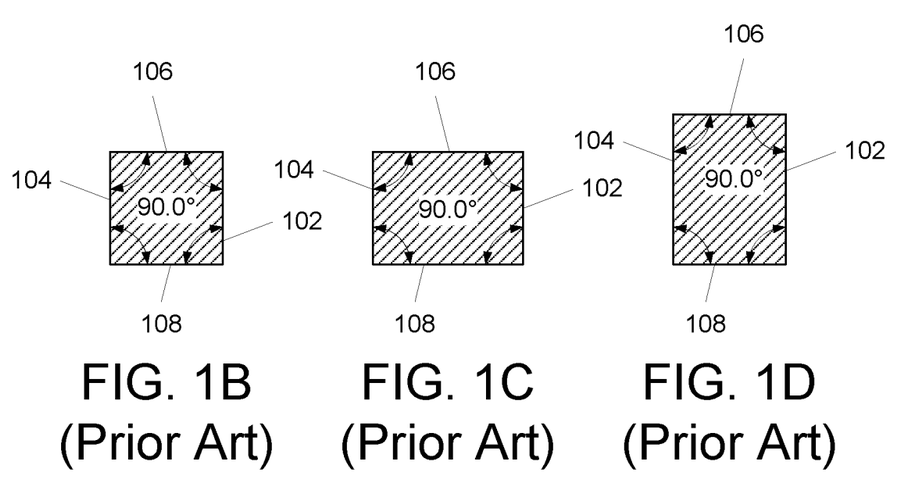
FIG. 1B illustrates, in simplified form, one representative common example of a cross section of the conventional denture bar of FIG. 1A taken at A-A.
FIG. 1C illustrates, in simplified form, another representative common example of a cross section of the conventional denture bar of FIG. 1A taken at A-A.
FIG. 1D illustrates, in simplified form, another representative common example of a cross section of the conventional denture bar of FIG. 1A taken at A-A.

FIG. 1B illustrates, in simplified form, one representative common example of a cross section of the conventional denture bar 100 of FIG. 1A taken at A-A. As can be seen, in FIG. 1B, the cross section is square so the superstructure-facing surface 106 meets both the vestibular-side surface 104 and the lingual-side surface 102 at a right angle (i.e., 90°). Likewise, the bone-facing surface 108 meets both the vestibular-side surface 104 and the lingual-side surface 102 at a right angle.

FIG. 1C illustrates, in simplified form, another representative common example of a cross section of the conventional denture bar 100 of FIG. 1A taken at A-A. As can be seen, in FIG. 1C, the cross section is a wide right rectangle so the superstructure-facing surface 106 again meets both the vestibular-side surface 104 and the lingual-side surface 102 at a right angle. Likewise, the bone-facing surface 108 also meets both the vestibular-side surface 104 and the lingual-side surface 102 at a right angle.

FIG. 1D illustrates, in simplified form, another representative common example of a cross section of the conventional denture bar 100 of FIG. 1A taken at A-A. As can be seen, in FIG. 1C, the cross section is an elongated right rectangle so, here too, the superstructure-facing surface 106 meets both the vestibular-side surface 104 and the lingual-side surface 102 at a right angle and the bone-facing surface 108 meets both the vestibular-side surface 104 and the lingual-side surface 102 at a right angle.

Figure 1E:
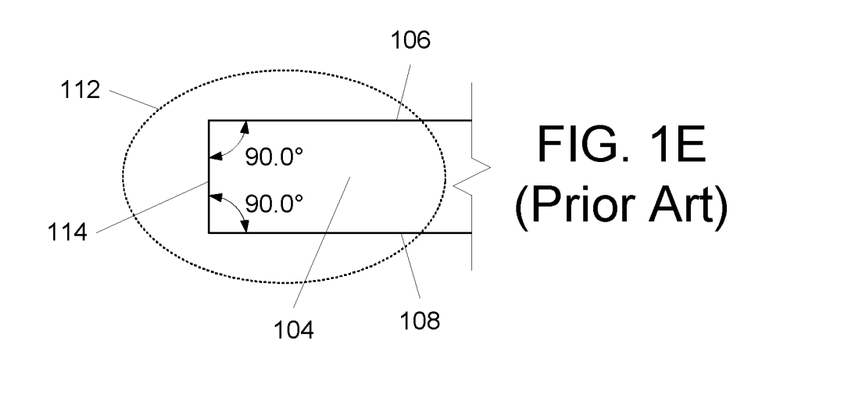
FIG. 1E illustrates, in simplified form, a side view of a portion of the conventional denture bar of FIG. 1A.

FIG. 1E illustrates, in simplified form, a side view of a portion 112 of the conventional denture bar 100 of FIG. 1A. As can be seen, in this view, the bone-facing surface 108 at the distal end 110 and the superstructure-facing surface at the distal end 110 each also abut the distal end surface at an angle of 90°.

At this point it should be noted that the conventional denture bar 100 will also include attachments, typically four for a full denture bar 100, with two in the anterior portion and two in the distal portion, as well as some means of attaching the denture bar 100 to the underlying bone, typically in the form of dental implant screws or the like.

In contrast to the foregoing, I have recognized that, with conventional denture bars, such as depicted in FIGS. 1A-1E, a cause of the dislodgment of the overdenture is that the pressure of the maxillary front teeth against the anterior of the overedenture causes the distal end to pivot away from the jaw towards the palate and thereby dislodge it from the rear attachments.

Figure 2A:
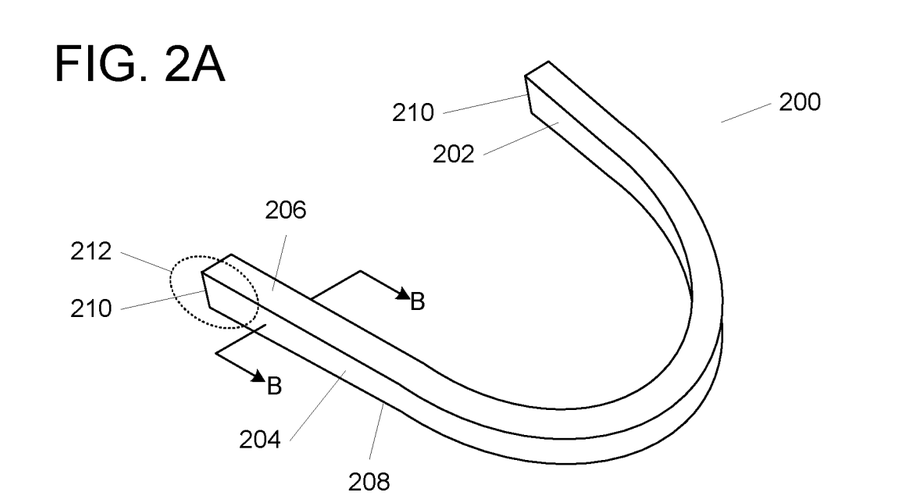
FIG. 2A illustrates, in simplified form, a simplified example of a denture bar incorporating my solution.

FIG. 2A illustrates, in simplified form, a simplified example of a denture bar 200 incorporating my solution. As with conventional denture bars, the denture bar 200 of FIG. 2A is made of the includes a lingual-side surface 202, a vestibular-side surface 204, a superstructure-facing surface 206 and a bone-facing surface 208. The lingual-side surface 202 and vestibular-side surface 204 are also opposite each other, as are the superstructure-facing surface 206 and bone-facing surface 208. The denture bar 200 also has a distal end 210 (on each side in the case of a full denture or on one side in the case of a partial denture).

Unlike conventional denture bars however, denture bars incorporating my solution will be formed with an angled distal end 210, lingual-side surface 202, and vestibular-side surface 204. Specifically, in overview, the superstructure-facing surface 206 at the distal end 214 will "overhang" the bone-facing surface 208 at the distal end 214. In addition, with some implementation variants the vestibular-side edge of the bone-facing surface 208 will protrude beyond the vestibular-side edge of the superstructure-facing surface 206 and the lingual-side edge of the superstructure-facing surface 206 will protrude beyond the lingual-side edge of the bone-facing surface 208.

Figures 2B, 2C, 2D:
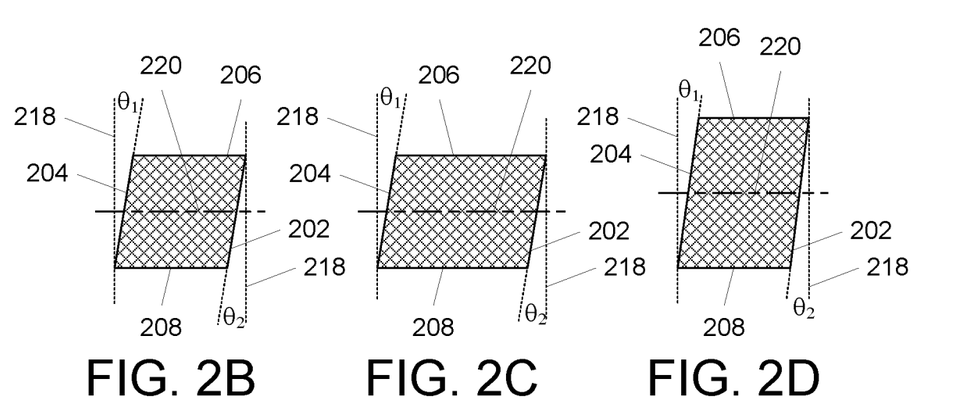
FIGS. 2B-2D illustrate, in simplified form, different representative examples of cross sections (respectively, equilateral, wide and elongate) of a denture bar of FIG. 2A taken at B-B.

In this regard, FIGS. 2B-2D illustrate, in simplified form, different representative examples of cross sections (respectively, equilateral, wide and elongate) of a denture bar 200 of FIG. 2A taken at B-B. As can be seen, in the cross sections of each of FIGS. 2B-2D, unlike conventional denture bars, the denture bar 200 is arranged such that the vestibular-side edge of the superstructure-facing surface 206 is relieved from the vestibular-side edge of the bone-facing surface 208 by an angle $\theta_1$ and the lingual-side edge of the bone-facing surface 208 is relieved from the lingual-side edge of the superstructure-facing surface 206 by an angle $\theta_2$, with and being measured relative to an axis 218 that is perpendicular to a longitudinal plane 220 passing through the lingual-side surface 202 and vestibular-side surface 204 of the denture bar 200. Ideally, the angles $\theta_1$ and $\theta_2$ are both equal and measure between 10° and 25° at any given cross section location, with an optimal angle being 15°. In most cases angles of 15°±2° will be used. Note here that, although preferably $\theta_1=\theta_2$, in some implementations, they could differ from each other by up to 5°, however, that is less than optimal and such deviations may be unsuitable for particular individual circumstances.

Figure 2E:
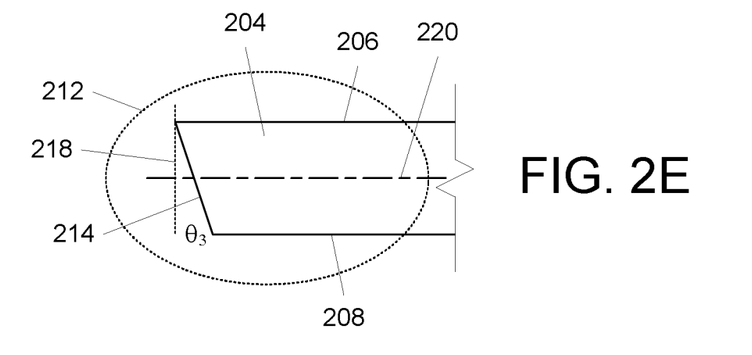
FIG. 2E illustrates, in simplified form, a side view of a portion of the denture bar of FIG. 2A.

FIG. 2E illustrates, in simplified form, a side view of a portion 212 of the denture bar 200 of FIG. 2A. As can be seen, in this view, the bone-facing surface 208 at the distal end 214 is relieved from the superstructure-facing surface 206 at the distal end 214 by an angle of $\theta_3$. As with, angles $\theta_1$ and $\theta_2$, $\theta_3$ will be an angle between 10° and 25° relative to the axis 218 perpendicular to a longitudinal plane 220 passing through the lingual-side surface 202 and vestibular-side surface 204 of the denture bar 200. Again, ideally, $\theta_3$ will be 15° and, in most cases angles of 15°±2° will be used. Moreover, in some cases, $\theta_3$ can differ from $\theta_1$ and/or $\theta_2$ by up to 5° as well, although, as above, that is less desirable and, in some cases, will not allow a denture bar and superstructure to properly mate.

As should now be understood and appreciated, the use of an "undercut" or recessed distal end surface, when mated to a conforming surface of an overdenture superstructure create a form of angled locking structure that will resist the forces applied by the front teeth of the opposing jaw against the anterior of the overdenture and, thus, prevent dislodgement without requiring any screw or plunger-type mechanism in the rear.

At this point it should be noted that, although the lingual-side surface 202, vestibular-side surface 204, superstructure-facing surface 206, bone-facing surface 208 and distal end 214 surface are all shown as flat surfaces, it is to be understood (and as will be evident from the description below) that those surfaces may deviate from flat based upon the patient's jaw anatomy and that such deviations are entirely within the scope of my solution. To the extent such deviations exist, the angles described herein should be measured based upon one or more cross sections, such as the cross section of the denture bar 200 of FIG. 2A taken at B-B (or elsewhere) and can be based upon a squaring of the edges of the superstructure-facing surface 206 and the bone-facing surface 208) and, for the distal end 214, should be measured at a cross section near the distal edge of the bone-facing surface 208.

Advantageously, my solution allows for use of less attachment elements (conventional ball attachments, locators, clips, screws, other conventional attachments used for this purpose, etc.), particularly near the distal end of the prosthesis. Indeed with my solution, any attachment element(s) (also referred-to herein as "attachments") can be placed only to the anterior-side of the first molar position (i.e., under or to the anterior-side of the second premolar), typically between the first molar position and the incisor position. In fact, some implementations of my solution will only use a single attachment that is centrally located at or near the extreme anterior part of the denture bar.

My approach, also allows the attachments to be placed on any of the lingual-side surface 202, the vestibular-side surface 204 (typically within the buccal area between the first molar position and the incisor position) or on the superstructure-facing surface 206 (as is most typical). As a result, many implementations will only require 1 or 2 attachments to secure the overdenture to the denture bar 200, despite the increased pressure applied by the maxillary front teeth against the anterior of the overdenture with a class III mesiocclusion.

Figure 3:
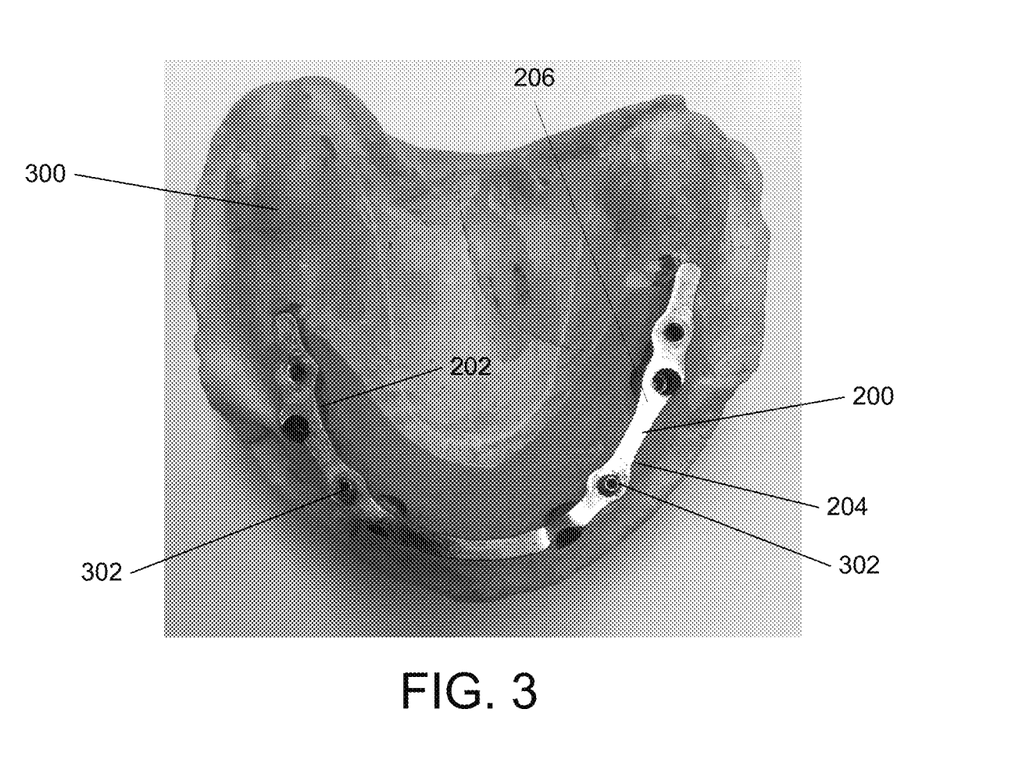
FIG. 3 is a photograph of one actual implementation of a dental bar incorporating my solution.

FIG. 3 is a photograph of one actual implementation of a dental bar 200 incorporating my solution as mounted (using conventional mounts) on a model of part 300 of the upper jaw of a dental patient. As can be seen in FIG. 3, the dental bar 200 includes two attachments 302, in the form of conventional ball attachments on the on the superstructure-facing surface 206 of the dental bar 200.

Figure 4:
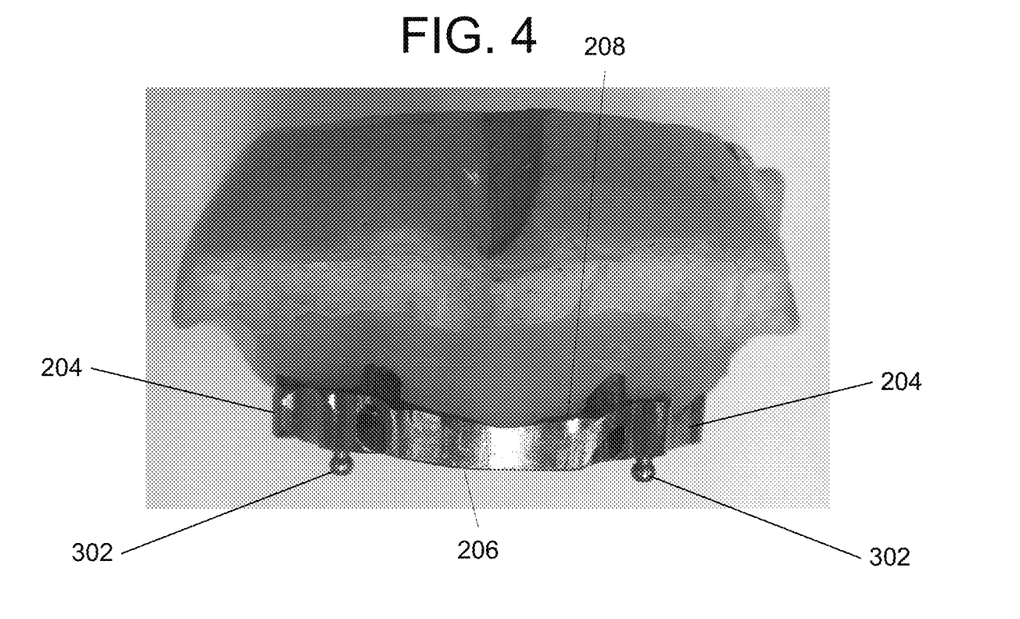
FIG. 4 is a photograph of a front view of the dental bar of FIG. 3.

FIG. 4 is a photograph of a front view of the dental bar 200 of FIG. 3.

Figure 5:
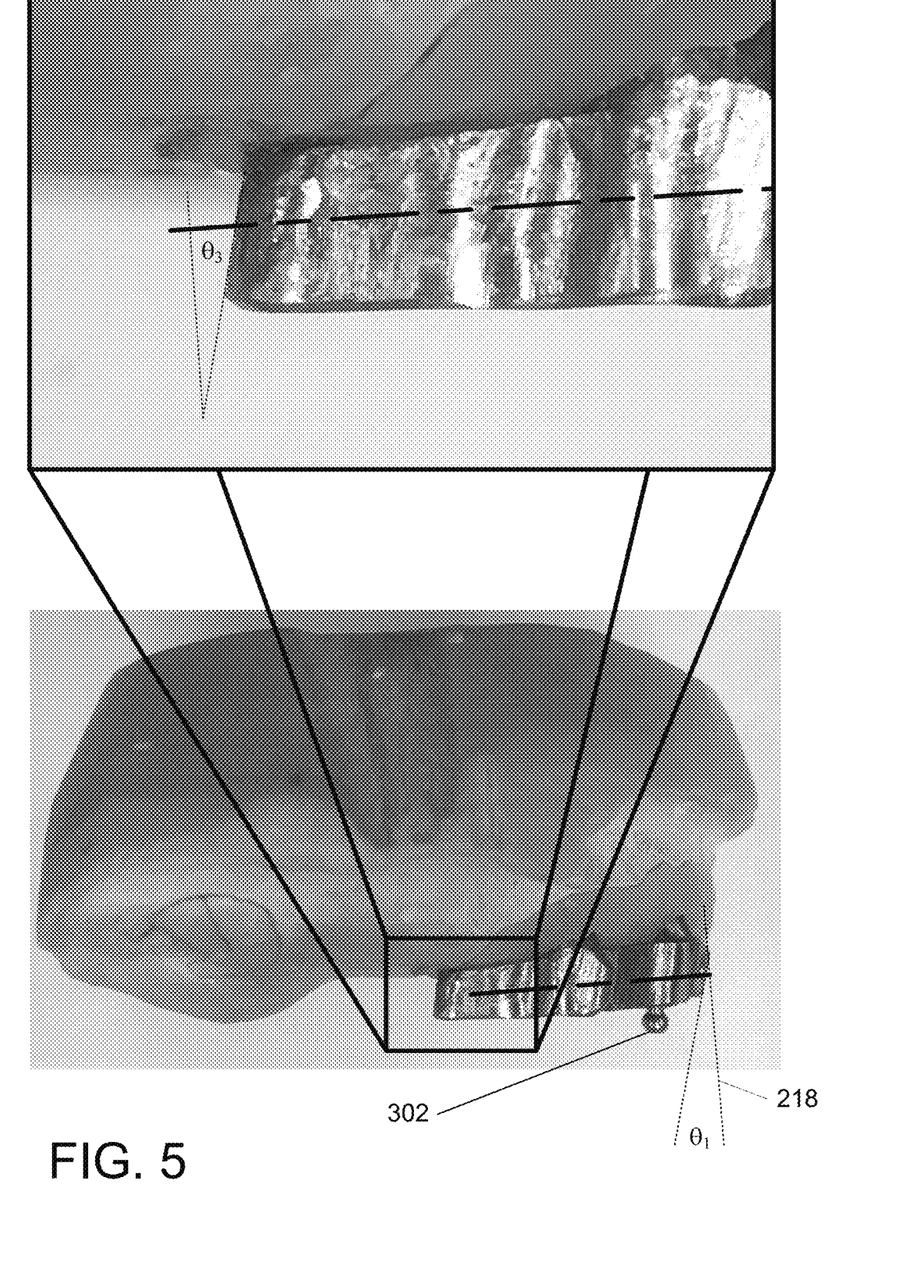
FIG. 5 is a photograph of a side view of the dental bar of FIG. 3.

FIG. 5 is a photograph of a side view of the dental bar 200 of FIG. 3 showing the vestibular-side 204 offset $\theta_1$, including an enlarged portion of that view showing the distal end 214 offset $\theta_3$ as described herein.

Figure 6:
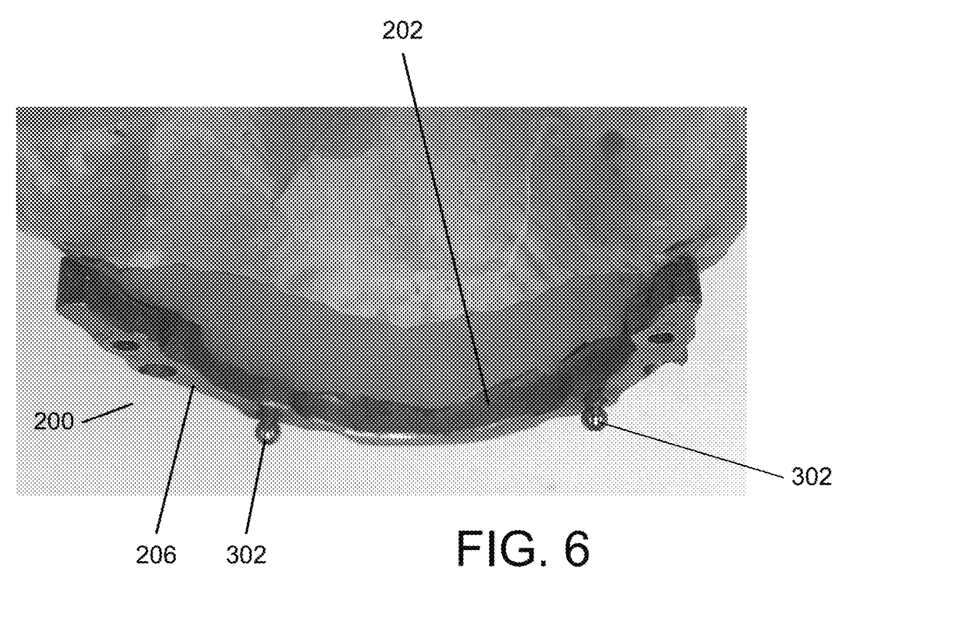
FIG. 6 is a photograph of a rear view of the dental bar of FIG. 3.

FIG. 6 is a photograph of a rear view of the dental bar 200 of FIG. 3.

Figure 7A:
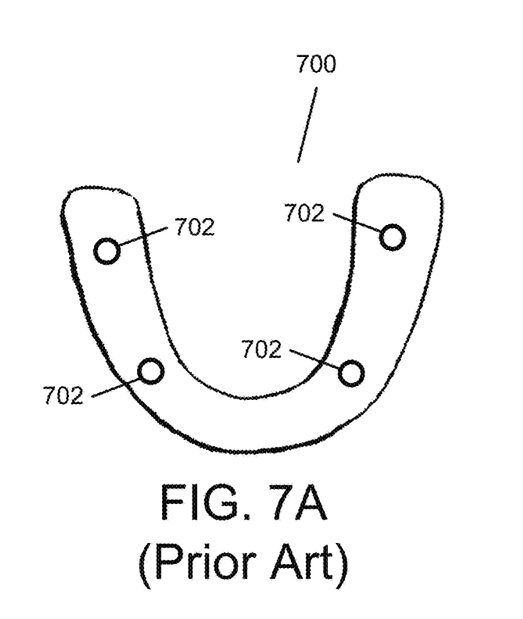
FIG. 7A is an illustration, in simplified form, of a top view of a conventional overdenture superstructure.

FIG. 7A is an illustration, in simplified form, of a top view of a conventional overdenture superstructure 700. As shown in FIG. 7, the overdenture superstructure includes features 702 that are designed to matingly correspond to the attachments on a conventional denture bar.

Figure 7B:
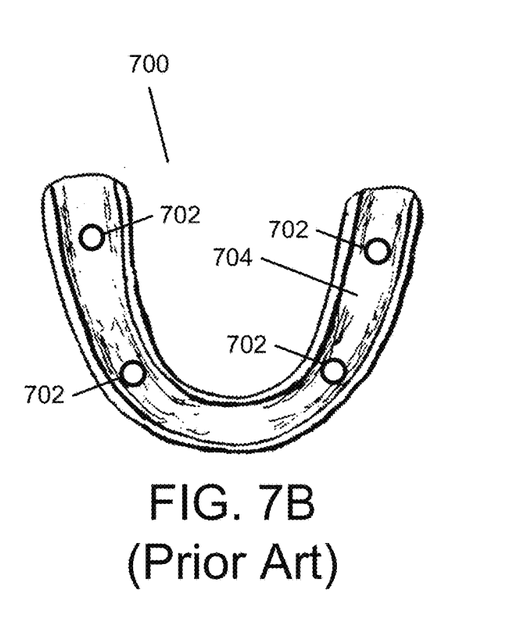
FIG. 7B is an illustration, in simplified form, of a bottom view of the conventional overdenture superstructure of FIG. 7A.

FIG. 7B is an illustration, in simplified form, of a bottom view of the conventional overdenture superstructure 700 of FIG. 7A. As can be seen, the overdenture superstructure 700 is manufactured with a cavity or recess 704 that is intended to correspond to the shape and depth of the denture bar with which it will be used.

Figure 8A:
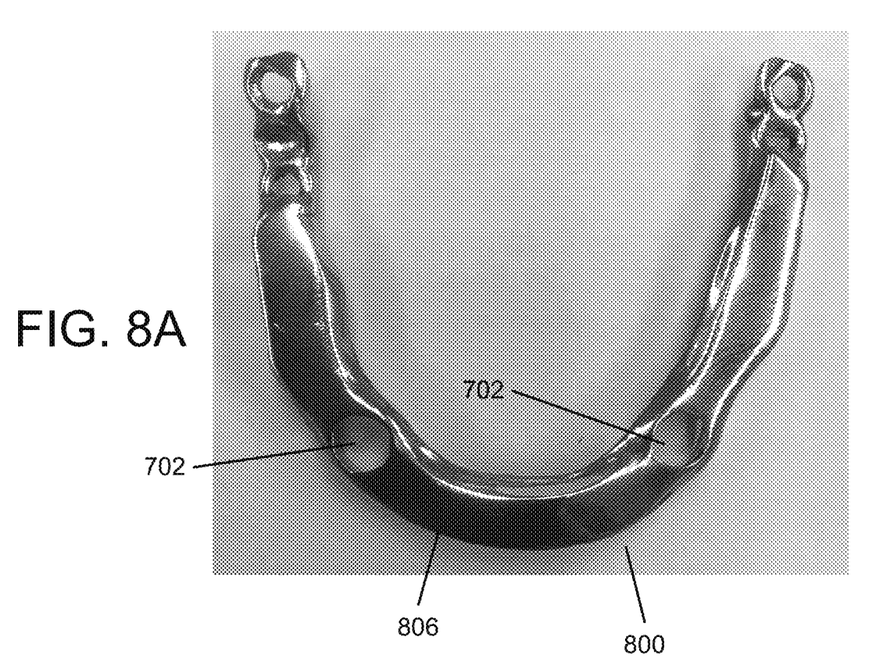
FIG. 8A is a photographic false teeth-facing side view of an overdenture superstructure configured to specifically be used with the denture bar of FIG. 3.

FIG. 8A is a photographic false teeth-facing side view of an overdenture superstructure 800 configured to specifically be used with the denture bar 200 of FIG. 3. As can be seen, this overdenture superstructure 800 includes only two features 702, in this case that correspondingly mate with the ball attachments 302 of FIGS. 3-6. As shown, they are advantageously only located on the anterior side of the first molar position.

Figure 8B:
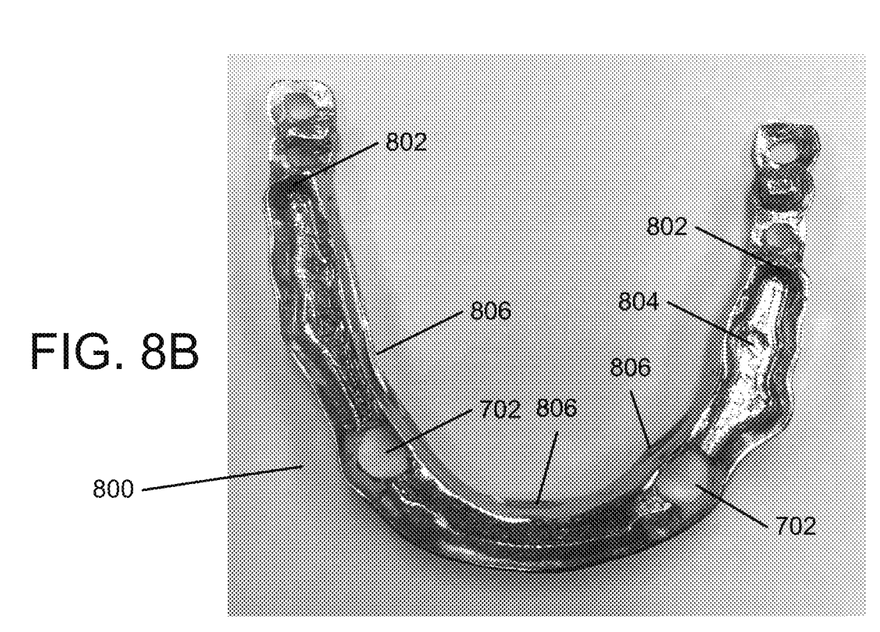
FIG. 8B is a photographic underside view of the overdenture superstructure of FIG. 8A.

FIG. 8B is a photographic underside view of the overdenture superstructure 800 of FIG. 8A. As can be seen in FIG. 8B, the overdenture superstructure 800 has a cavity or recess 804 that is the "negative" (in shape and depth) of the denture bar 200 of FIG. 3. In addition, from this view it can be seen that, in contrast to the superstructure 700 of FIG. 7B, the overdenture superstructure 800 of FIG. 8B further includes an angled distal surface 802 that substantially, conformingly mates with the angled distal end 214 of the denture bar 200 of FIG. 3 to form a locking structure to lock the distal end 214 of the denture bar 200 and angled distal surface 802 of the overdenture superstructure 800.

In addition, the overdenture superstructure 800 of FIGS. 8A and 8B include a lip 806 on both the lingual and vestibular sides of the overdenture superstructure 800 to aid with retention of the acrylic portion (not shown) of the denture that contains the false teeth to the overdenture superstructure 800 and prevent dislodging of the acrylic portion from the overdenture superstructure 800 under normal conditions.

Figure 9:
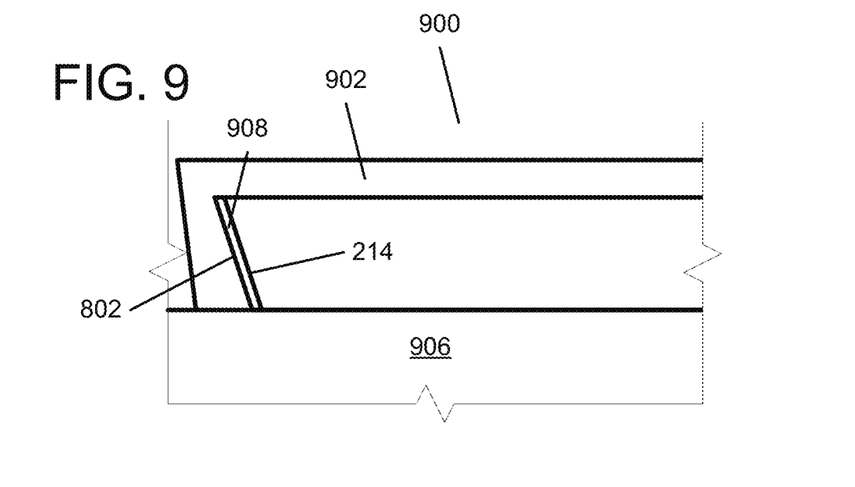
FIG. 9 illustrates, in simplified form, a cross section of a portion of an example denture retaining system incorporating one variant of my solution.

FIG. 9 illustrates, in simplified form, a cross section of a portion 900 of an example denture retaining system incorporating one variant of my solution. As shown, the overdenture superstructure 902 cross section is illustrated as it would look when it is positioned on a denture bar 904 on a lower jaw 906 (only a portion of which is shown) according to one variant described herein. As shown, the distal end 214 of the denture bar 904 substantially corresponds to the distal surface 802 of the overdenture superstructure 902.

Note that in FIG. 9, a small gap 908 (over-exaggerated) is shown between the distal surface 802 and the distal end 214. The purpose of that gap 906 is merely to represent that, although the two surfaces 802, 214 should directly correspond, as noted above, their angles can be off relative to each other by up to 5° although this would result in a (less desirable) gap 906 of some sort between the two.

Figure 10:
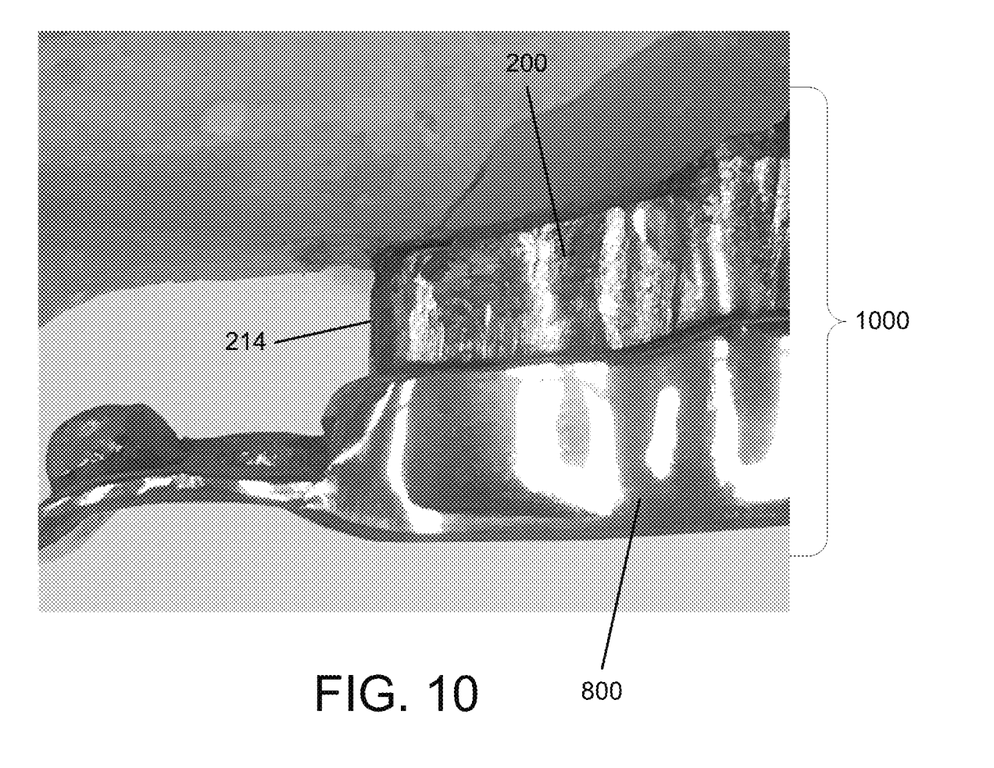
FIG. 10 is a photographic side view of a distal portion of the overdenture superstructure of FIG. 8 positioned over the denture bar of FIGS. 3-6 immediately before the two are coupled together via the attachment elements and corresponding features.

FIG. 10 is a photographic side view of a distal portion 1000 of the overdenture superstructure 800 of FIG. 8 positioned over the denture bar 200 of FIGS. 3-6 immediately before the two are coupled together via the attachment elements 302 and corresponding features 702.

Figure 11:
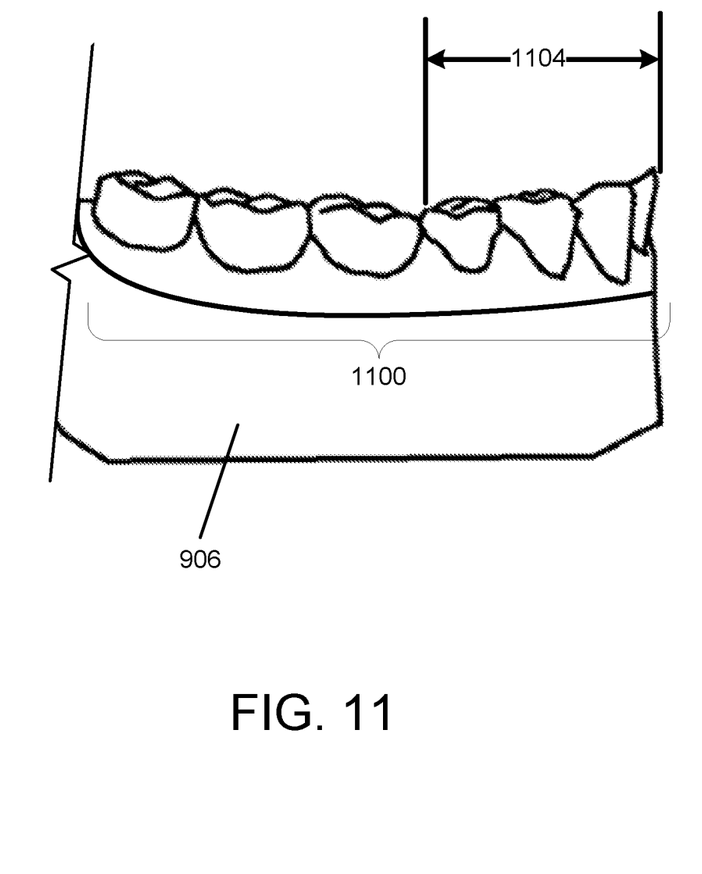
FIG. 11 illustrates, in simplified form a complete version of a denture prosthesis 1100 incorporating my denture retaining system solution as affixed to the lower jaw of a person with a Class II distocclusion.

FIG. 11 illustrates, in simplified form a complete version of a denture prosthesis 1100 incorporating my denture retaining system solution as affixed to a lower jaw 906 of a person with a Class II distocclusion. Also shown in FIG. 11, the range 1104 is the only range within which at least one attachment element needs to be located as described above (i.e., to an anterior side of the first molar's position).

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A denture retaining system comprising:
    a denture bar constructed for affixation to a human, the denture bar having
        a distal end,
        a lingual-side surface,
        a vestibular-side surface,
        a bone-facing surface and
        a superstructure-facing surface that is opposite the bone-facing surface,
        wherein the bone-facing surface at the distal end is relieved from the superstructure-facing surface at the distal end by a first angle of between 10° and 25° measured relative to an axis perpendicular to a longitudinal plane passing through the lingual side and vestibular side surfaces of the denture bar;
        wherein an anterior portion of the superstructure-facing surface is relieved from a corresponding anterior portion of the vestibular side surface by an anterior angle that is within 5° of the first angle and
    an overdenture superstructure having a distal surface that substantially conformingly mates to the distal end of the denture bar when the overdenture superstructure is positioned against the superstructure-facing surface of the denture bar, and is coupled to the denture bar by no more than two attachment elements located only on the superstructure-facing surface at a position on the denture bar to an anterior side of a first molar position.

2. The denture retaining system of claim 1, wherein the first angle is 15°±2°.

3. The denture retaining system of claim 1, wherein:
    the distal surface of the overdenture superstructure is oriented relative to the distal end of the denture bar at a lock angle that is in the rage of equal to, or greater than, 0° but less than or equal to 5°, when the overdenture superstructure is
        a) positioned against the superstructure-facing surface of the denture bar, and
        b) coupled to the denture bar.

4. The denture retaining system of claim 1, wherein:
    the distal surface of the overdenture superstructure and the distal end of the denture bar are both linear and the distal surface of the overdenture superstructure is oriented relative to the distal end of the denture bar such that a gap will exist between the two when the overdenture superstructure is
        a) positioned against the superstructure-facing surface of the denture bar, and
        b) is coupled to the denture bar.

5. The denture retaining system of claim 4, wherein the gap is defined by an angle existing between the distal end of the denture bar and distal surface of the overdenture superstructure that is greater than 0° but is less than or equal to 5°.

6. The denture retaining system of claim 1, wherein the no more than two attachment elements comprises at least one of:
    a ball attachment, a denture locator, a denture clip, or a screw.

7. The denture retaining system of claim 6, wherein the no more than two attachment elements are located on at least one of:
    the superstructure-facing surface,
    the lingual-side surface, or
    the vestibular-side surface.

8. The denture retaining system of claim 6, wherein the no more than two attachment elements consists of exactly one attachment element located near an extreme anterior part of the denture bar.

9. The denture retaining system of claim 6, wherein the no more than two attachment elements consists of exactly two attachment elements.

10. The denture retaining system of claim 6, wherein the no more than two attachment elements are located on the vestibular-side surface within a buccal area extending between a first molar position and an incisor position.

11. The denture retaining system of claim 1, wherein the no more than two attachment elements are located on at least one of:
    the superstructure-facing surface,
    the lingual-side surface, or
    the vestibular-side surface.

12. The denture retaining system of claim 1, wherein the overdenture superstructure includes a lip along a substantial portion of its vestibular side.

13. The denture retaining system of claim 1, wherein:
    a vestibular-side edge of the bone-facing surface protrudes beyond a vestibular side edge of the superstructure-facing surface so as to define a second angle;
    a lingual-side edge of the superstructure-facing surface protrudes beyond a lingual-side edge of the bone-facing surface so as to define a third angle; and
    wherein the second angle and third angle are equal.

14. The denture retaining system of claim 1, wherein:
a vestibular-side edge of the bone-facing surface protrudes beyond a vestibular side edge of the superstructure-facing surface so as to define a second angle;
a lingual-side edge of the superstructure-facing surface protrudes beyond a lingual-side edge of the bone-facing surface so as to define a third angle; and
wherein the second angle and third angle differ from each other and the difference is greater than 0° but less than or equal to 5°.

15. The denture retaining system of claim 1, wherein:
at least one of the lingual-side surface, vestibular-side surface, superstructure-facing surface, bone-facing surface, or distal surface is flat.

16. The denture retaining system of claim 1, wherein:
at least one of the lingual-side surface, vestibular-side surface, superstructure-facing surface, bone-facing surface, or distal surface is not flat in order to accommodate anatomy of a patient's jaw to which the denture bar will be affixed.

17. A denture bar constructed to be affixed in a human mouth and engaged by an overdenture superstructure, the denture bar comprising:
a distal end,
a lingual-side surface,
a vestibular-side surface,
a bone-facing surface,
a superstructure-facing surface that is opposite the bone-facing surface, and
no more than two attachment elements located at on the denture bar to an anterior side of a first molar position;
wherein the bone-facing surface at the distal end is relieved from the superstructure-facing surface at the distal end by a first angle of between 10° and 25° relative to an axis perpendicular to a longitudinal plane passing through the lingual side and vestibular side surfaces of the denture bar; and
wherein at least an extreme anterior portion of the superstructure-facing surface is relieved from a corresponding extreme anterior portion of the vestibular surface by an angle that is within 5° of the first angle.

18. The denture bar of claim 17, wherein the first angle is 15°±2°.

19. The denture bar of claim 17, wherein the no more than two attachment elements comprise at least one of:
a ball attachment, a denture locator, a denture clip, or a screw.

20. The denture bar of claim 19, wherein the no more than two attachment elements consist of exactly one attachment element located on one of:
the superstructure-facing surface,
the lingual-side surface, or
the vestibular-side surface.

* * * * *